(12) United States Patent
Yoneda

(10) Patent No.: US 6,865,440 B1
(45) Date of Patent: Mar. 8, 2005

(54) NUMERIC CONTROL APPARATUS FOR MACHINE TOOLS

(75) Inventor: Koji Yoneda, Kanagawa (JP)

(73) Assignees: Sodick Co., Ltd. (JP); Sodick America Corporation, San Jose, CA (US)

( * ) Notice: Subject to any disclaimer, the term of this patent is extended or adjusted under 35 U.S.C. 154(b) by 0 days.

(21) Appl. No.: 10/785,943

(22) Filed: Feb. 26, 2004

(51) Int. Cl.$^7$ .............................................. G06F 19/00
(52) U.S. Cl. ........................ 700/170; 700/30; 318/560
(58) Field of Search ................................ 700/180–181, 700/169–170, 28–31, 41–42; 318/561, 625, 560

(56) References Cited

U.S. PATENT DOCUMENTS

| | | | | |
|---|---|---|---|---|
| 5,410,234 A | * | 4/1995 | Shibata et al. | 318/700 |
| 5,568,377 A | * | 10/1996 | Seem et al. | 700/37 |
| 5,598,304 A | * | 1/1997 | Choi et al. | 360/78.04 |
| 6,281,650 B1 | * | 8/2001 | Yutkowitz | 318/561 |
| 6,515,442 B1 | * | 2/2003 | Okubo et al. | 318/560 |

FOREIGN PATENT DOCUMENTS

JP       6-182651       7/1994

\* cited by examiner

Primary Examiner—Leo Picard
Assistant Examiner—Zoila Cabrera
(74) Attorney, Agent, or Firm—McDermott Will & Emery LLP

(57) ABSTRACT

A numeric control apparatus for machine tools having a moveable member which is operated by a servomotor, including a controlled system, where the controlled system includes a servomotor and a moveable member, and a model of the controlled system, having a system parameter. The numeric control apparatus also includes a command generator for generating a command value, a reference input value generating controller for transmitting a reference input value to the controlled system and to the model, in response to receiving the command value, and an analyzing section for storing a measured output of the controlled system and a measured output of the model. The numeric control apparatus further includes a servo controller for transmitting a simulation current to the model, in response to receiving the command value, where the servo controller includes design parameters, and a user interface section for receiving an operator input, where the operator input includes the reference input value, the simulation current, the design parameters, and the system parameter of the model.

8 Claims, 7 Drawing Sheets

NUMERIC CONTROL APPARATUS FOR MACHINE TOOLS

FIELD OF THE INVENTION

The present invention generally relates to control apparatus and, in particular relates to numeric control ("NC") apparatus for machine tools which include servomotor controllers.

BACKGROUND OF THE INVENTION

Tools or work instruments often include moveable members, such a bit for a drill or a moveable surface for a work table. These moveable members are traditionally operated by servomotors, which are, in turn, regulated by servo controllers. A position detector on a tool typically measures the position or velocity of the moveable member, and transmits a signal to the servo controller. The servo controller subsequently controls the servomotor so that the position or velocity of the moveable member matches an input value. The input value is generated within numeric control apparatus, and the servo controller is but one component of the numeric control apparatus.

The development of modern control theory has had a profound effect upon the development and design of servo systems for machine tools. Modern control theory requires that a control system be dynamically modeled, by creating a mathematical model of the system known as a state equation, including a system parameter. In general, this approach is more complex than the design of a controllers which utilize conventional proportional-integral-derivative ("PID") controllers.

In order to model the controlled system, an identification experiment must be performed, in which reference inputs are supplied to the servo controller. The servo controller controls the servomotor in the machine tool, which in turn operates the moveable member. Measurement data is collected for each reference input, representing the various states of the moveable member, and the measurement data stored in the memory of the numeric controller. Typically, the measurement data is then transferred from the numeric controller to an external computer in which a mathematical tool such as MATLAB® is installed, via a serial interface. The computer models the controlled system based on the reference inputs and corresponding measurement data.

Using the collected measurement data, a virtual controller is designed and simulated using the computer, based on the state equation or model of the controlled system. If the controlled system operates according to specifications using the simulated controller, a physical controller is manufactured for use in the numeric controller. Otherwise, gains in the virtual controller are adjusted until simulation results become adequate.

As such, while measured data is typically gathered in the numeric controller, the modeling and design of the controller are ordinarily performed in an external computer. The drawback to this technique is that the model must be generated externally.

Accordingly, it is desirable to provide for a numeric control apparatus for machine tools to overcome the drawbacks of conventional numeric control apparatus. Additionally, it is desirable to provide a numeric control apparatus for machine tools capable of modeling the controlled system, and designing and simulating a controller, in order to overcome the drawbacks of prior art modeling systems.

SUMMARY OF THE INVENTION

It is an object of the invention to address disadvantages found in prior art numeric control apparatus, particularly with regard to those disadvantages which relate to the modeling of a controlled system.

In one aspect of the present invention, a numeric control apparatus for machine tools having a moveable member which is operated by a servomotor, includes a controlled system, where the controlled system includes a servomotor and a moveable member, and a model of the controlled system, having a system parameter. The numeric control apparatus also includes a command generator for generating a command value, a reference input value generating controller for transmitting a reference input value to the controlled system and to the model, in response to receiving the command value, and an analyzing section for storing a measured output of the controlled system and a measured output of the model. The numeric control apparatus further includes a servo controller for transmitting a simulation current to the model, in response to receiving the command value, where the servo controller includes design parameters, and a user interface section for receiving an operator input, where the operator input includes the reference input value, the simulation current, the design parameters, and the system parameter of the model.

According to an alternate aspect of the present invention, a numeric control method for controlling machine tools having a moveable member which is operated by a servomotor includes a reference value setting step of setting a reference input value, a first transmitting step of transmitting a command value to a first controller, a servomotor supply step of supplying the reference input value from the first controller to a servomotor in response to receiving the command value, and a servomotor measuring step of measuring an output of the servomotor. The numeric control method also includes a servomotor storing step of storing the output measured in the servomotor measuring step, a system parameter setting step of setting system parameters for a model, a model supply step of supplying the reference input value from the first controller to the model in response to receiving the command value, a model measuring step of measuring an output of the model, a model storing step of storing the output measured in the model measuring step, and a first comparing step of comparing the output stored in the servomotor storing step with the output stored in the model storing step. The numeric control method further includes an adjusting step of adjusting gains of the model, a design parameters setting step of setting design parameters of a second controller, a simulation current setting step of setting a simulation current, and a second transmitting step of transmitting the command value to the second controller. Moreover, the numeric control method further includes a simulation supply step of supplying the simulation current from the second controller to the model in response to receiving the command value, a second comparing step of comparing the command value with the output of the model measuring step, and a design parameters adjusting step of adjusting the design parameters of the second controller.

This brief summary has been provided so that the nature of the invention may be understood quickly. A more complete understanding of the invention can be obtained by reference to the following detailed description of the preferred embodiments thereof in connection with the attached drawings. It is to be understood that other embodiments may be utilized and changes may be made without departing from the scope of the present invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

Figure 1:
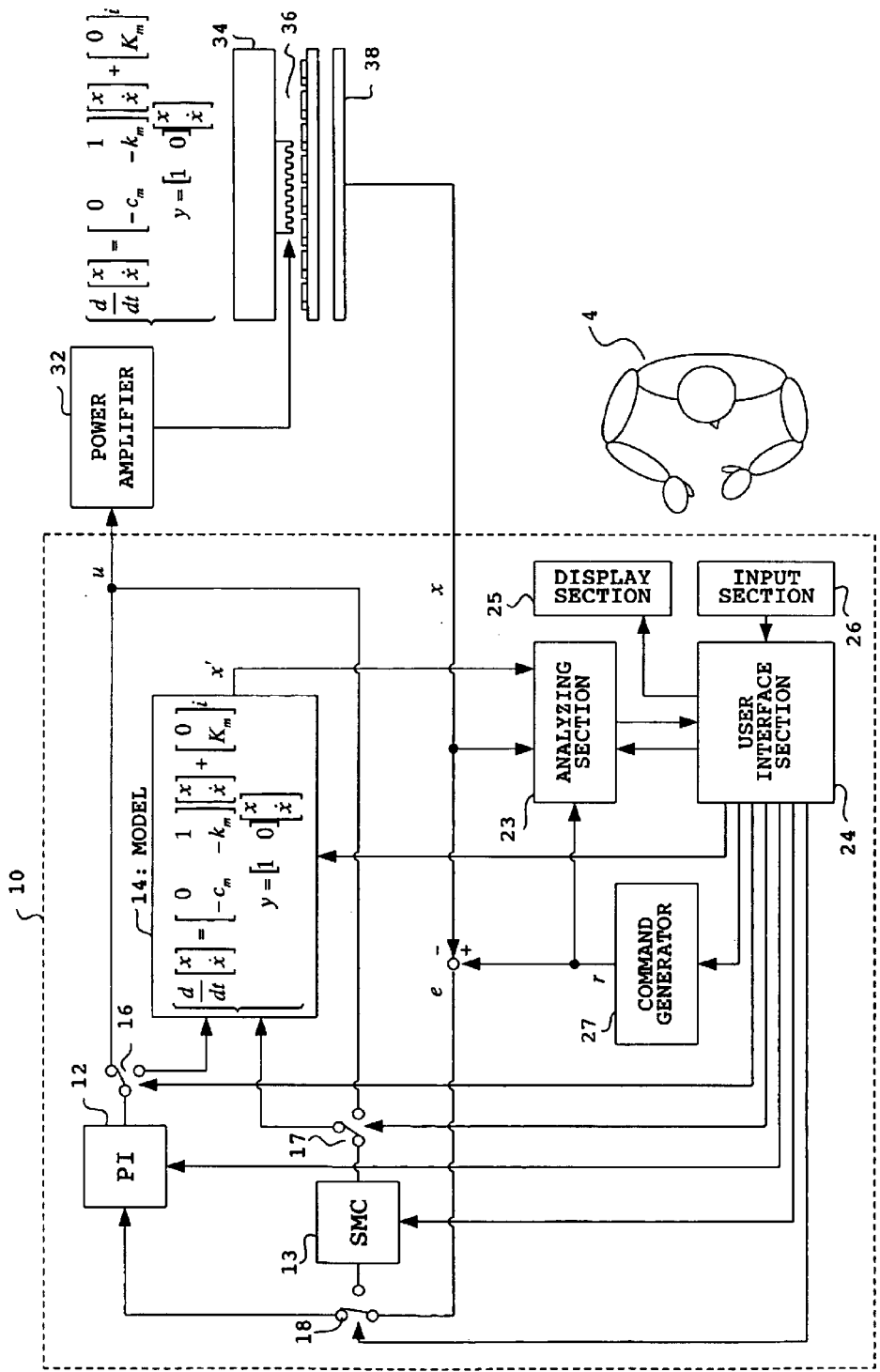
FIG. 1 depicts a block diagram of a numeric control apparatus for machine tools in accordance with one embodiment of the present invention.

A numeric control ("NC") apparatus for machine tools will now be described in detail with reference to FIG. 1.

Table 34 is driven by linear motor 36. In the illustrated embodiment, numeric control apparatus 10 includes proportional-integral ("PI") controller 12 and sliding mode controller ("SMC") 13, either of which may alternatively be selected for use as a servo controller, using switch 18. The servo controller provides a controlled current as a specified input u to linear motor 36 through power amplifier 32. The position of table 34 or linear motor 36 is measured by position detector 38. The measured position x is transmitted to NC apparatus 10, and an error e between the measured position x and the command position r is supplied to the servo controller. A controlled system including table 34 and linear motor 36 can be represented by the following equation of motion:

$$M \cdot \ddot{x} = K_t \cdot i - c \cdot \dot{x} - k \cdot x \quad (1)$$

where M is a mass, x is a position of linear motor 36, $K_t$ is a driving force constant, i is a current, c is a damping constant and k is a spring constant.

The equation of motion, equation (1), can be transformed into the following equation:

$$\ddot{x} + c_m \cdot \dot{x} + k_m \cdot x = K_m \cdot i \quad (2)$$

where $K_m$, $c_m$ and $k_m$ are given as follows:

$$K_m = K_t/M \cdot c_m = c/M \cdot k_m = k/M \quad (3)$$

In this regard, the state equation of the controlled system may be represented as follows:

$$\begin{cases} \dot{z} = A \cdot z + B \cdot u \\ y = C \cdot z \end{cases}$$

$$A = \begin{bmatrix} 0 & 1 \\ -c_m & -k_m \end{bmatrix}, \quad B = \begin{bmatrix} 0 \\ K_m \end{bmatrix}, \quad C = \begin{bmatrix} 1 & 0 \end{bmatrix}, \quad z = \begin{bmatrix} x \\ \dot{x} \end{bmatrix}, \quad u = i$$

Analyzing section 23 has a memory (not shown) for storing the measured position x. NC apparatus 10 includes model 14 of the controlled system, where PI controller 12 is connected to model 14 through switch 16, and SMC 13 is connected to model 14 through switch 17. Output x' of model 14 is connected to the analyzing section 23.

NC apparatus 10 further includes user interface ("UT") section 24, display section 25, input section 26, and command generator 27. Display section 25 is a display monitor for displaying text and images, such as a cathode-ray tube ("CRT") or a liquid-crystal display ("LCD") device. Input section 26 is for entering commands or data to operate and control the computer operating system programs as well as the application programs, and may be a keyboard. Input section 26 may also be used to select and manipulate graphics and text objects displayed on display section 25 as part of an interaction with and control of UI section 24. In this regard, input section 26 could also be any type of pointing device, including a joystick, a mouse, a trackball or a touchpad without departing from the scope of the invention.

UI section 24 prepares screens using a graphical user interface (GUI) so that a user, such as operator 4 can design a servo controller. UI section 24 receives operator input, and is in communication with PI controller 12, SMC 13, model 14, switch 16, switch 17, switch 18, analyzing section 23, display section 25, input section 26 and command generator 27. Command generator 27 generates command position r in response to an output of UI section 24. The command position r is transmitted to the selected servo controller and also to analyzing section 23.

Figure 2:
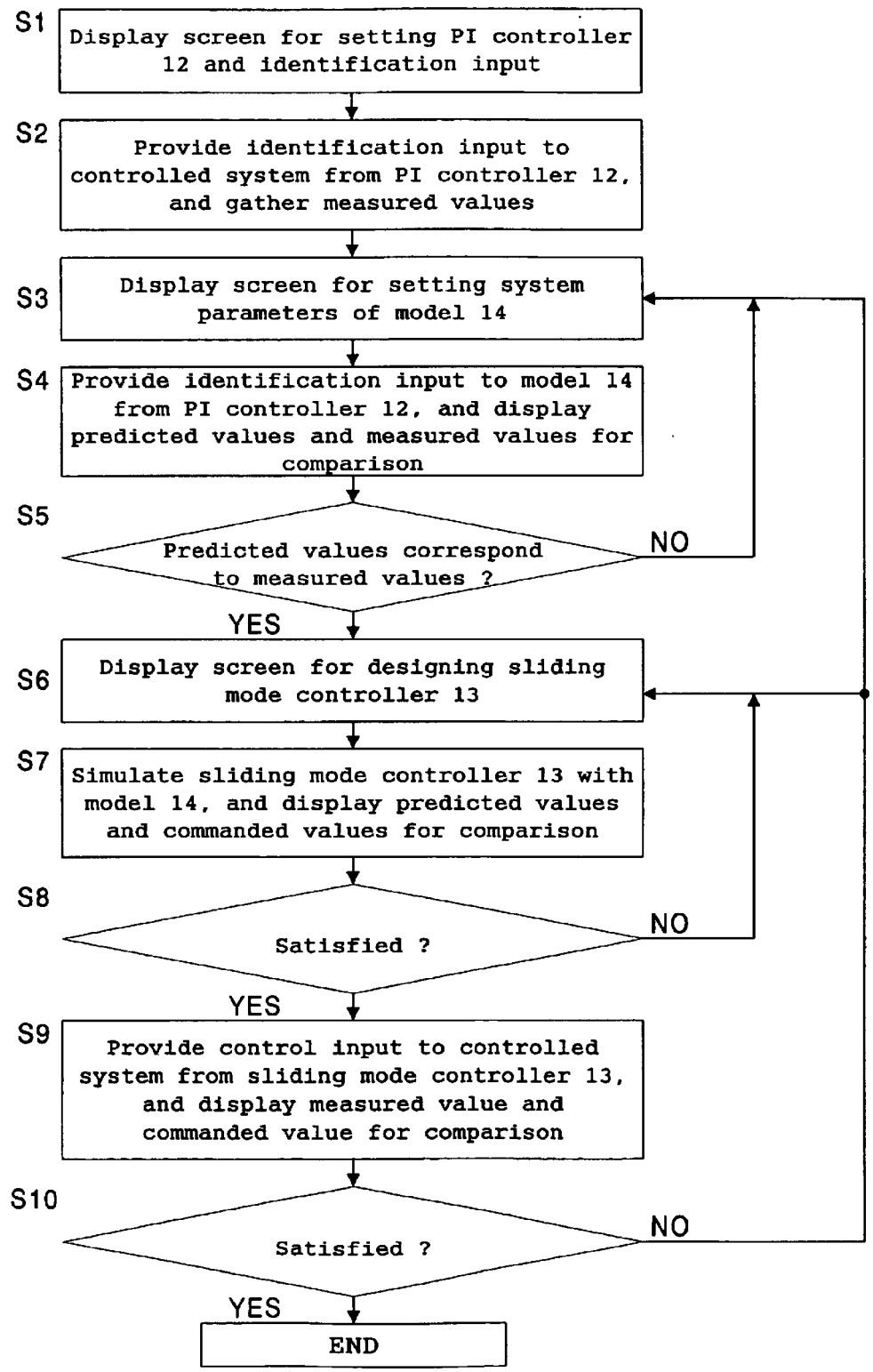
FIG. 2 depicts a flowchart which shows the operation of the numeric control in accordance with the example embodiment of the present invention illustrated in FIG. 1.

Operation of the numeric control apparatus 10 will now be described in detail, with reference to the drawings, particularly FIG. 2, with corresponding references to FIGS. 3a, 3b, 3c, 3d, 3e, 3f, 3g, 3h and 3i.

Operator 4 must first identify the controlled system in order to design the sliding mode controller 13 (step S1). Specifically, using this experiment, system parameters $K_m$, $c_m$ and $k_m$ are determined. Initially, display section 25 displays a "Current Step" screen (FIG. 3a) when operator 4 selects this tab on the appropriate menu. Using the "Current Step" screen, operator 4 can set conditions for the identification experiment, such as specifying a reference input.

Figure 3A:
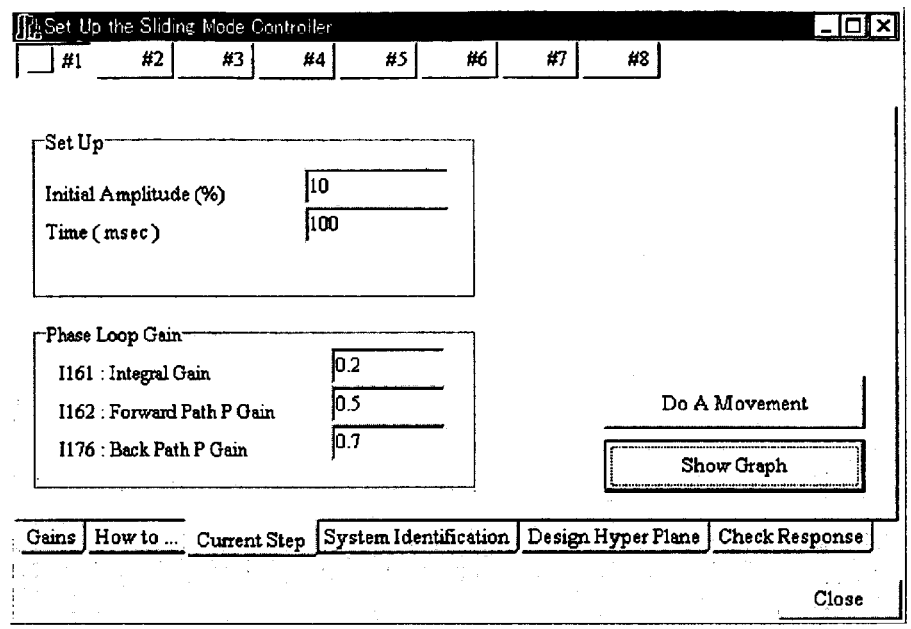
FIG. 3a depicts the "Current Step" screen.

In the example illustrated in FIG. 3a, the PI controller 12 is configured to generate a step current as a reference input, so that an output step response of the controlled system may be measured. Specifically, "Initial Amplitude (%)" is an amplitude and "Time" is a duration of the step current. Furthermore, the integral gain, proportional gain for forward path control and a proportional gain for back path control are set in the appropriate spaces on the "Current Step" screen.

When operator 4 selects the "Do A Movement" control on the "Current Step" screen, PI controller 12 gains are set to the values input to UI section 24 (step S2). UI section 24 controls switch 16 and switch 18 so that command generator 27 is connected to PI controller 12, and that PI controller 12 is connected to linear motor 36. In response to an output of user interface section 24, command generator 27 generates a command position r so that PI controller 12 can generate a reference step current. As such, a reference step current is supplied to linear motor 36, and position detector 38 detects the measured position x of either table 34 or linear motor 36. The measured position x is stored in the memory of analyzing section 23.

Figure 3B:
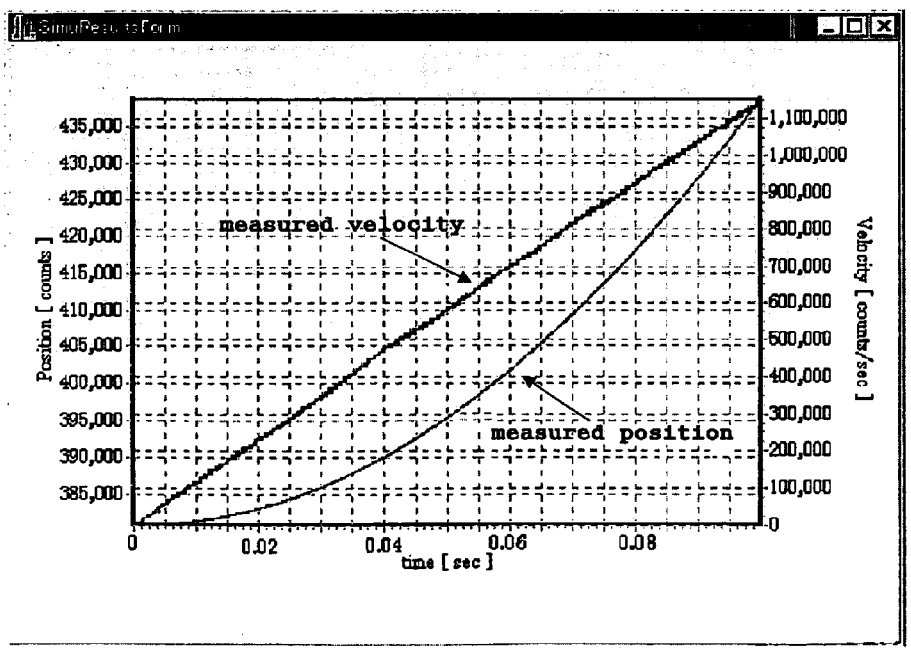
FIG. 3b depicts a graph of measured position and measured velocity versus time.

When operator 4 clicks on the "Show Graph" control, a menu (not depicted) is displayed for setting types, colors and other features of a graph. Analyzing section 23 reads the measured position x and computes actual position, velocity or acceleration. As depicted in FIG. 3b, UI section 24 receives the data from the memory of analyzing section 23, and a graph of measured data plotted against a set period of time and displayed on display section 25.

Figure 3C:
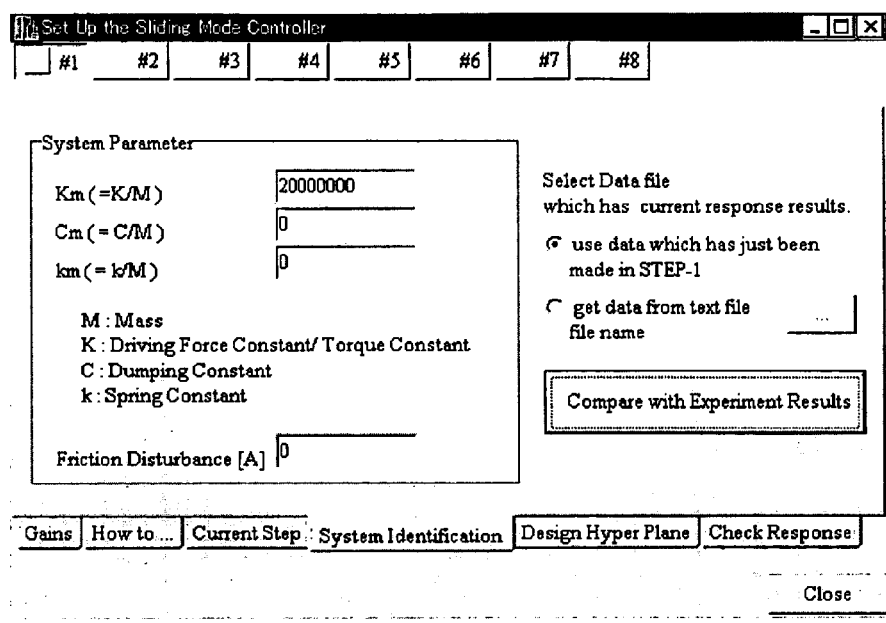
FIG. 3c depicts the "System Identification" screen.

As shown in FIG. 3c, operator 4 can also elect to display a "System Identification" screen on display section 25 (step S3). Operator 4 sets system parameters $K_m$, $c_m$, and $k_m$, so that the system response parameters of model 14 match those of the controlled system. These system response parameters help define the mathematical model of the controlled system.

When operator 4 clicks on the "Compare with Experiment Results" control in the "System identification" screen, UI section 24 incorporates the system parameters $K_m$, $c_m$ and $k_m$ in model 14, and controls switch 16 so that the model 14 becomes connected to PI controller 12 (step S4). In response to an output of UI section 24, command generator 27 generates a command position r so that PI controller 12 can generate the specified step current. A step current is supplied as a reference to model 14, and an output x' of model 14 is supplied to analyzing section 23. Analyzing section 23 supplies a predicted position x', a predicted velocity, the measured position and the measured velocity, to UI section 24.

Figure 3D:
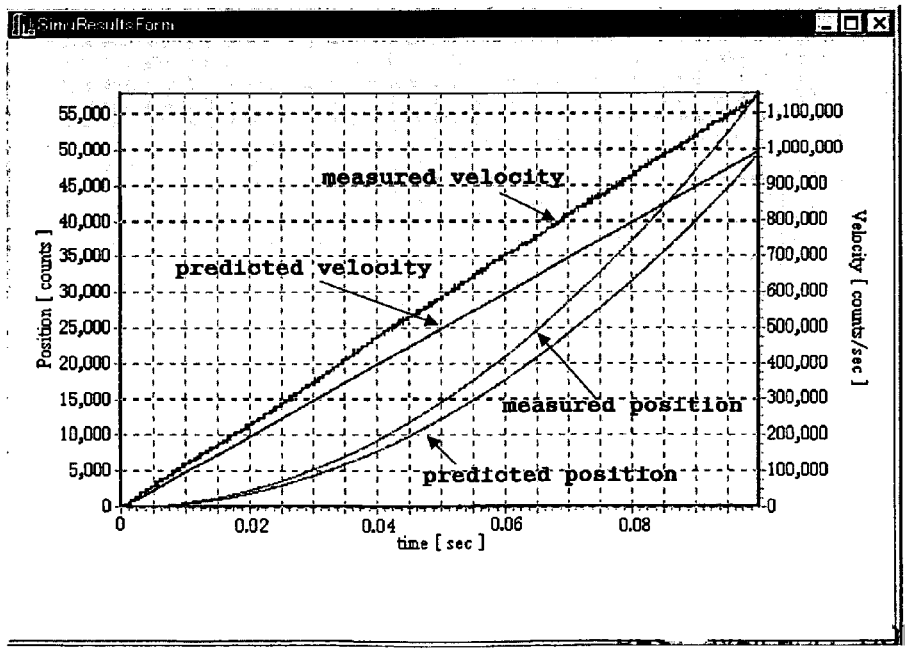
FIG. 3d is a graph of measured position, measured velocity, predicted position and predicted velocity versus time.

For ease of comparison, the output of model 14 to the reference input is displayed on display section 25 alongside a response of the controlled system to the reference input. As shown in FIG. 3d, this graph includes the predicted position, the predicted velocity, the measured position and the measured velocity. The part of the graph representing the measured position and measured velocity should be the same as the data plotted in FIG. 3b.

Operator 4 determines if the predicted values correspond to the measured results, to ensure that model 14 is proper (step S5). If operator 4 judges that the model 14 is proper, the process proceeds to step S6. Otherwise, the process proceeds to step S3.

Figure 3E:
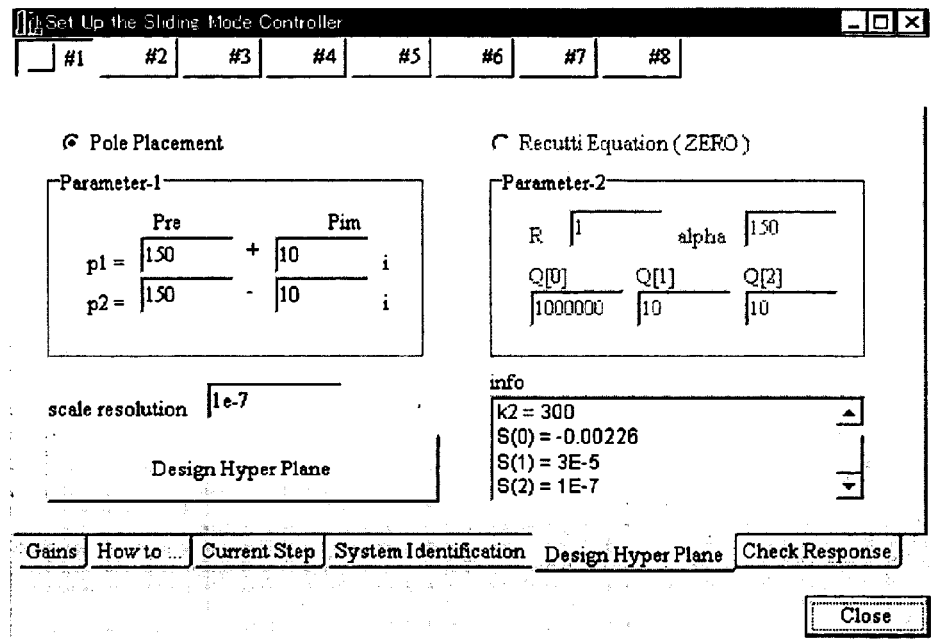
FIG. 3e depicts the "Design Hyperplane" screen.

In response to an operator input, the user screens for designing the sliding mode controller 13 are displayed on display section 25 (step S6). As depicted in FIG. 3e, a "Design Hyper Plane" screen is one of such screens. In this screen, operator 4 can design the switching hyper plane which regulates the state of the controlled system. Entry fields "p1" and "p2" denote the poles of the controlled system and entry fields "pre" and "pim" respectively denote real and imaginary coefficients. When operator 4 clicks on "Design Hyper Plane" control, UI section 24 designs the switching hyper plane using well-known pole placement techniques, and implements the switching hyper plane into the SMC 13.

Figure 3F:
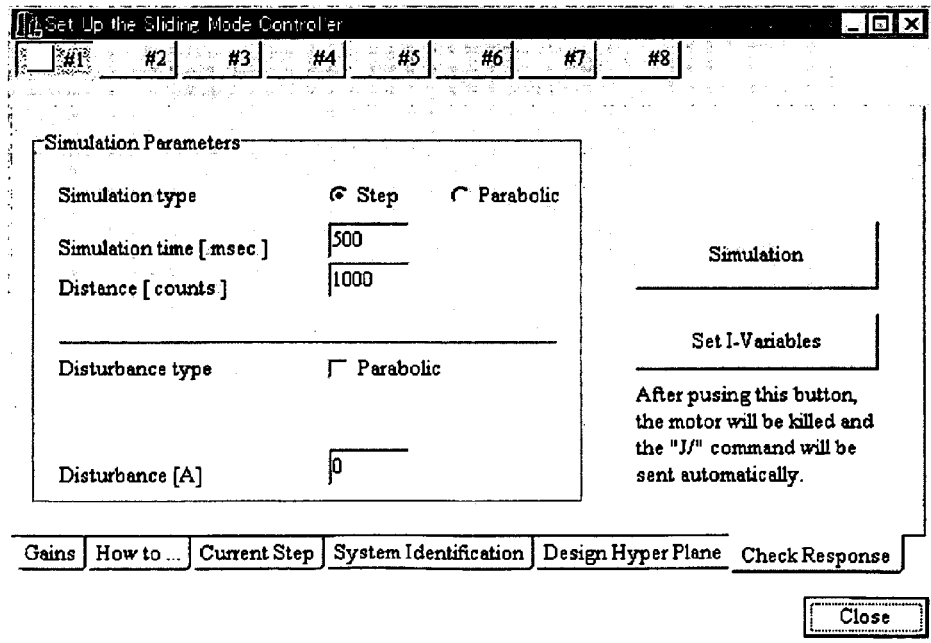
FIG. 3f is the "Check Response" screen.

Operator 4 then simulates the SMC 13 with model 14 (step S7). As depicted in FIG. 3f, a "Check Response" screen is displayed on display section 25 in response to operator input, in which operator 4 can set further simulation conditions. Operator 4 may select a step response or a parabolic response.

Operator 4 enters a "simulation time," which represents a duration of the simulation, and a "distance," which represents movement of table 34 or linear motor 36. When operator 4 clicks on a "simulation" control, UI section 24 controls switch 13 and switch 14 so that command generator 27 is connected to SMC 13 and so that SMC 13 is connected to model 14. In response to an output of UI section 24, command generator 27 generates a command position r so that the SMC 13 can generate a specified current. Thus, a reference input is supplied to model 14, and an output response x' of model 14 is transmitted to the analyzing section 23.

Figure 3G:
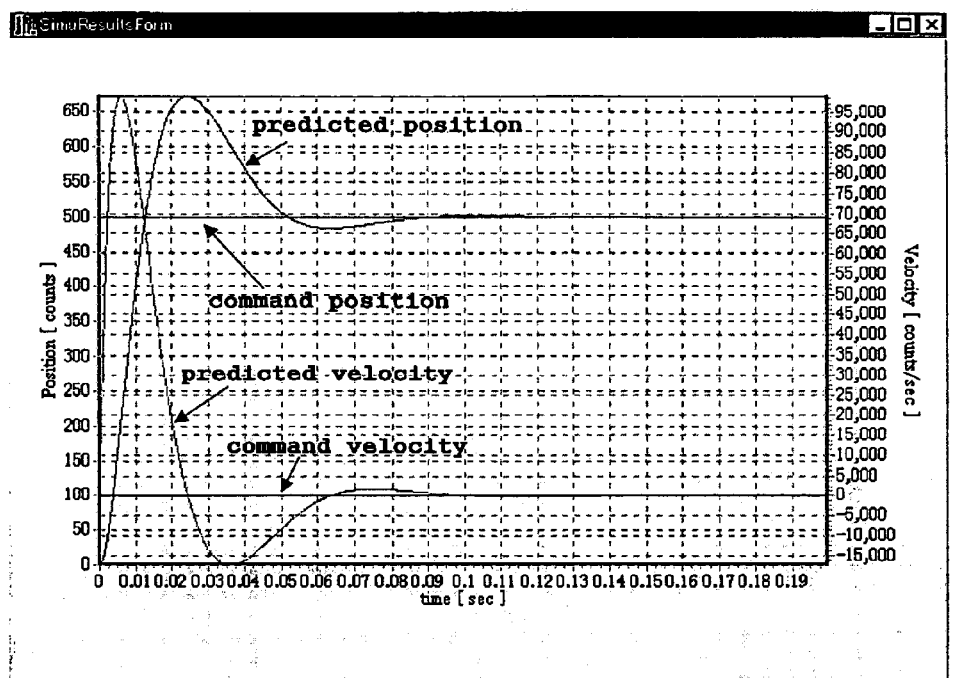
FIG. 3g depicts a graph of command position, command velocity, measured position and measured velocity versus time.

Analyzing section 23 supplies a command position, a command velocity, a predicted position and a predicted velocity, to UI section 24. As depicted in FIG. 3g, and for ease of comparison, UI section 24 plots the predicted values and command values.

Operator 4 compares the predicted values to the command values and judges if the sliding mode controller 13 is satisfactory (step S8). When operator 4 judges that the SMC 13 is satisfactory, the process proceeds to step S9. Otherwise, the process proceeds to the step S6.

Figure 3H:
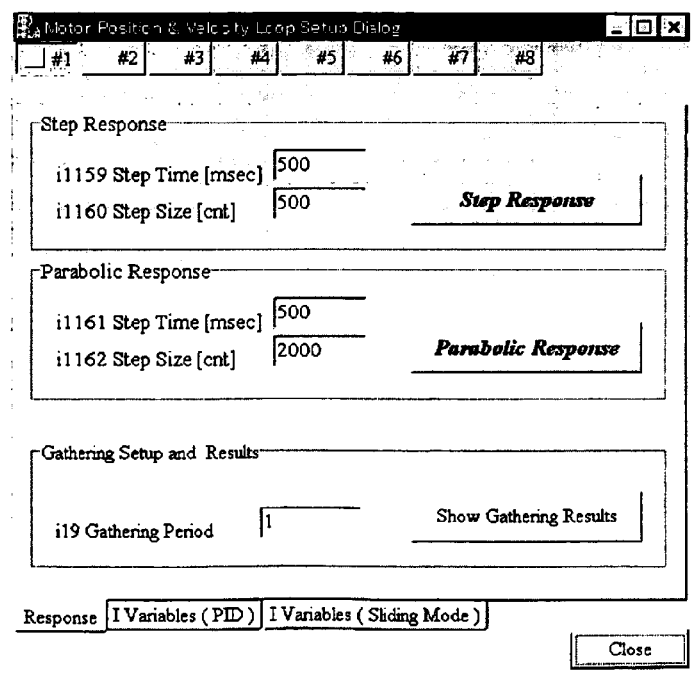
FIG. 3h depicts the "Response" screen.

As shown in FIG. 3h, and in response to an operator input, a "Response" screen is displayed on display section 25. In the "Response" screen, operator 4 sets experimentation parameters for the sliding mode controller 13, including the selection of either a step response or a parabolic response. When operator 4 clicks on the "Show Gathering Results" control, UI section 24 controls switch 17 and switch 18 so that command generator 27 is connected to SMC 13 and so that SMC 13 is connected to linear motor 36. In response to an output of the UI section 24, command generator 27 generates a command position r so that SMC 13 can generate a set current.

Figure 3I:
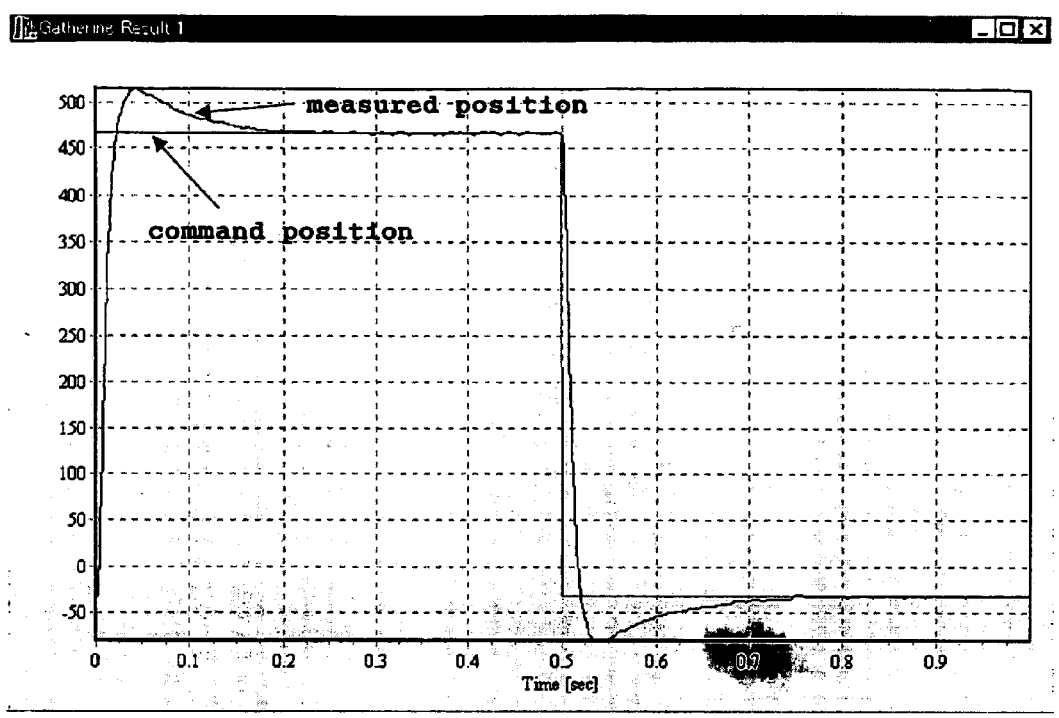
FIG. 3i depicts a graph of command position and measured position versus time.

As shown in FIG. 3i, UI section 24 receives the measured position and the command position from analyzing section 23 and plots these values for easy comparison (step S10). Operator 4 compares the measured position to the command position and judges if the sliding mode controller 13 is satisfactory. When operator 4 judges that the sliding mode controller 13 is satisfactory, the process ends. Otherwise, the process returns back to step S3 or S6.

FIGS. 1, 2, 3a, 3b, 3c, 3d, 3e, 3f, 3g, 3h and 3i illustrate an example of the preferred embodiment of a computing system that executes program code, or program or process steps, configured to control machine tools. Other types of computing systems may also be used as well.

The invention has been described with particular illustrative embodiments. It is to be understood that the invention is not limited to the above-described embodiments and that various changes and modifications may be made by those of ordinary skill in the art without departing from the spirit and scope of the invention.

What is claimed is:

1. A numeric control apparatus for machine tools having a movable member which is operated by a servomotor, comprising:
    a controlled system comprising
        a servomotor; and
        a moveable member;
    a model of said controlled system, having a system parameter;
    a command generator for generating a command value;
    a reference input value generating controller for transmitting a reference input value to the controlled system and to the model, in response to receiving the command value;
    an analyzing section for storing a measured output of said controlled system and a measured output of said model;
    a servo controller for transmitting a simulation current to the model, in response to receiving the command value, wherein said servo controller includes design parameters; and
    a user interface section for receiving an operator input, wherein the operator input includes the reference input value, the simulation current, the design parameters, and the system parameter of said model.

2. The numeric control apparatus for machine tools according to claim 1, further comprising a switch for connecting the reference input value generating controller to either said servomotor or said model.

3. The numeric control apparatus for machine tools according to claim 1, further comprising a servo controller switch for connecting the servo controller to either said servomotor or said model.

4. The numeric control apparatus for machine tools according to claim 1, wherein said servo controller is a sliding mode controller.

5. The numeric control apparatus for machine tools according to claim 1, wherein the reference input value generating controller is a proportional-integral controller.

6. The numeric control apparatus for machine tools according to claim 1, wherein the command value refers to a commanded position.

7. The numeric control apparatus for machine tools according to claim 1, where the command value refers to a commanded velocity.

8. A numeric control method for controlling machine tools having a moveable member which is operated by a servomotor, comprising the steps of:

setting a reference input value;

transmitting a command value to a first controller;

supplying the reference input value from the first controller to a servomotor in response to receiving the command value;

measuring an output of the servomotor;

storing the measured output of the servomotor;

setting system parameters for a model;

supplying the reference input value from the first controller to the model in response to receiving the command value;

measuring an output of the model;

storing the measured output of the model;

a first comparing step of comparing the measured output of the servomotor to the measured output of the model;

adjusting gains of the model;

setting design parameters of a second controller;

setting a simulation current;

transmitting the command value to the second controller;

supplying the simulation current from the second controller to the model in response to receiving the command value;

comparing the command value with the measured output of the model; and adjusting the design parameters of the second controller.

* * * * *